United States Patent [19]
Radlmann et al.

[11] 3,821,281
[45] June 28, 1974

[54] SULFONATO-BENZYL-MALONIC ACID ESTERS

[75] Inventors: Eduard Radlmann; Günther Nischk, both of Dormagen, Germany

[73] Assignee: Bayer Aktiengesellschaft, Leverkusen, Germany

[22] Filed: May 18, 1973

[21] Appl. No.: 361,530

[30] Foreign Application Priority Data
May 20, 1972 Germany............................ 2224786

[52] U.S. Cl................................ 260/470, 260/75 S
[51] Int. Cl............................................. C07c 143/52
[58] Field of Search ......... 260/470, 515 M, 475 SC, 260/507 R

[56] References Cited
UNITED STATES PATENTS
| | | | |
|---|---|---|---|
| 3,018,272 | 1/1962 | Griffing et al. | 280/470 |
| 3,213,155 | 10/1965 | Schniesheim | 260/683.2 |
| 3,578,704 | 5/1971 | McGuire et al. | 260/507 R |
| 3,700,721 | 10/1972 | Price et al. | 260/470 |

FOREIGN PATENTS OR APPLICATIONS
| | | | |
|---|---|---|---|
| 1,139,786 | 1/1969 | Great Britain | 260/515 R |

OTHER PUBLICATIONS
Adkins et al., J. Am. Chem Soc., 56, 2425 (1934).

*Primary Examiner*—Lorraine A. Weinberger
*Assistant Examiner*—John F. Terapane
*Attorney, Agent, or Firm*—Plumley & Tyner

[57] ABSTRACT

Sulfonato-benzyl-malonic diesters as new compounds and a process for the preparation thereof by condensing of a malonic acid diester with a sulfonato-benzaldehyde and thereafter hydrogenating the reaction product thus obtained. The new compounds are useful as intermediate products and especially useful as comonomers for the synthetic resin and fiber industry.

1 Claim, No Drawings

SULFONATO-BENZYL-MALONIC ACID ESTERS

This invention relates to sulfonato-benzyl-malonic acid diesters which are obtained by the condensation of sulfonato-benzaldehyde with malonic acid esters via the stage of the benzal compound followed by hydrogenation and to a process for their preparation.

It is known to prepare benzyl-malonic esters or derivatives thereof by the condensation of malonic esters with benzaldehyde or its derivatives followed by hydrogenation. This so-called Knoevenagel condensation, however, does not succeed if the benzaldehyde contains salt-type substituents which render it insoluble in malonic esters or in the solvents hitherto used for this condensation. It has previously not been possible to obtain benzal malonic esters which contain sulfonate groups by condensation of the corresponding sulfonato-benzaldehydes and malonic esters. It was not until highly polar, non-aqueous solvents were used that condensation of sulfonato-benzaldehydes with malonic acid esters could successfully be carried out, followed by hydrogenation to prepare sulfonato-benzyl-malonic esters.

It is an object of this invention to provide new compounds which are useful as intermediate products for the synthetic resin and fiber industry. They are especially useful as comonomers. Further objects will be evident from the following description and the examples.

These objects are accomplished by a sulfonato-benzyl-malonic diester of the general formula

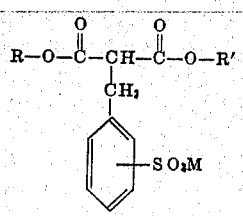

in which
R and R' which can be different or identical are a straight or branched chain alkyl group containing from 1–10 carbon atoms and
M represents a metal group.

It is another object of this invention to provide a process for the production of the abovementioned sulfonato-benzyl-malonic acid diester compound.

This object is accomplished by a process which comprises reacting a malonic acid diester of the general formula

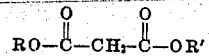

in which
R and R' have the meaning specified above with a sulfonato-benzaldehyde of the general formula

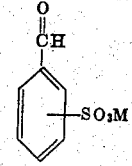

in which
M has the meaning indicated above
said reacting being effected as a condensation with the elimination of water in non-aqueous polar solvents with the addition of catalysts in the temperature range of 40°–150° C and thereafter hydrogenating the reacting product thus obtained.

Suitable malonic acid diesters are, for example, dimethyl malonate, diethyl malonate, malonic acid-tert.-butyl ester-methyl ester and malonic acid-di-tert.-butyl ester. The sulfonato-benzaldehydes used are preferably the alkali metal or alkaline earth metal salts. The following are given as examples: lithium 2-sulfonato-benzaldehyde, sodium-2-sulfonato-benzaldehyde, sodium-3-sulfonato-benzaldehyde, potassium-4-sulfonato-benzal-dehyde and calcium-4-sulfonato-benzaldehyde.

Suitable non-aqueous polar solvents are, for example, N,N-dimethylformamide, N,N-dimethylacetamide, N-methyl pyrrolidone or dimethylsulfoxide.

The following are examples of effective condensation catalysts: piperidine, piperidine acetate, ammonium acetate and β-alanine.

Preparation of a new sulfonato-benzyl-malonic acid diester by the process according to the invention may be carried out, for example, as follows:

To a combined solution of the malonic acid diester, the metal salt of a sulfonato-benzaldehyde and the condensation catalyst in a polar solvent such as N,N-dimethylformamide, a substance which will form an azeotropic mixture with the water of reaction is added for example benzene, and the reaction mixture is heated at the reflux temperature, using a water separator, until no more water separates. In order to obtain quantitative conversion of the sulfonato-benzaldehyde it is often advisable to use the malonic diester in excess. After the condensation, the excess malonic diester may be removed by distillation under reduced pressure. After completion of the condensation reaction, the resulting sulfonato-benzal-malonic diester can then be catalytically hydrogenated to the benzyl compound with Raney nickel and hydrogen without first being isolated. Isolation of the sulfonato-benzyl-malonic acid diester is carried out by removing the hydrogenation catalyst by filtration and then removing the solvent or solvent mixture by vacuum distillation. The desired compound is left behind in almost quantitative yield. In most cases, no further purification is required.

The new compounds are valuable intermediate products for the synthetic resin and fibre industry. Owing to their compatibility and low softening points, these dicarboxylic acid esters which contain sulfonate groups are especially useful as comonomers wherever other known ester sulfonates such as 4-sodium-sulfonato-benzoic acid ethyl ester or sodium-3,5-di-(carbomethoxy)-benzene sulfonate will not take part in esterification reactions on account of their incompatibility and high softening points.

The preparation of a terephthalic acid polyester which is acid modified with a sulfonato-benzyl-malonic acid ester is described below by way of example:

194 parts by weight of dimethyl terephthalate, 190 parts by weight of ethylene glycol and 8 parts by weight of a sulfonate of the formula

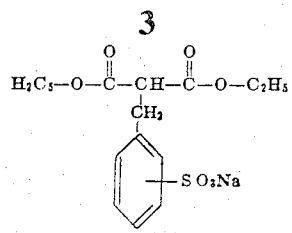

mixed with 0.4 parts by weight of zinc acetate and 0.6 parts by weight of antimony trioxide are introduced into a reaction vessel equipped with an anchor stirrer, a gas inlet tube, a distillation attachment, a condenser, a vacuum converter and a receiver. The reaction mixture is melted at 160°C under a stream of nitrogen and the stirrer is switched on. The temperature is maintained for 2 hours. It is then raised to 280°C in the course of a further two hours. The supply of nitrogen is then terminated and the pressure is slowly reduced to 0.03 mm Hg over a period of 1 hour. The rate of stirring is reduced from about 150 to about 20 revs per min due to the increased viscosity of the melt. The reaction is terminated after a further 2 hours. The colourless, homogeneous melt can be processed into shaped products such as threads. The threads can be stretched in the cold and dyed dark blue with a basic dye such as C.I. Basic blue 41. The colour has good resistance to washing. The threads have a softening range of 247° to 261°C and a viscosity of $\eta_{rel} = 2.01$.

The following examples, in which parts by weight are related to parts by volume as kilogrammes to litres are to further illustrate the invention without limiting it.

Example 1

1,456 parts by weight of sodium-2-sulfonato-benzaldehyde, 1,232 parts by weight of diethyl malonate and 17.5 parts by weight of piperidine as catalyst are dissolved in 2,100 parts by volume of N,N-dimethylformamide and 2,100 parts by volume of benzene and heated to the reflux temperature. The water of condensation formed is removed from the system by azeotropic distillation. After removal of benzene by distillation, the dimethylformamide solution is clarified with active charcoal and the benzylidene compound obtained is hydrogenated at a hydrogen pressure of 100 excess atmospheres for 1.5 hours at 95°C after the addition of 50 parts by weight of Raney Nickel. After removal of the catalyst by filtration, the dimethylformamide and excess diethyl malonate are distilled off quantitatively under vacuum. Sodium-2-sulfonate-benzyl-malonic acid diethyl ester remains behind in the form of a liquid which solidifies when cooled to 0°C and is solid at room temperature.

| Yield: | 2341 parts by weight (=95.5% of the theory) | | | | |
|---|---|---|---|---|---|
| Analysis: | C | H | O | S | Na |
| | % | % | % | % | % |
| Calculated: | 47.7 | 4.8 | 31.8 | 9.1 | 6.5 |
| Found: | 47.1 | 4.5 | 31.1 | 8.9 | 6.9 |

Example 2

192.0 parts by weight of lithium-4-sulfonato-benzaldehyde together with 176.0 parts by weight of diethyl malonate and 7.0 parts by weight of piperidine in a solvent mixture of 500 parts by volume of dimethyl sulfoxide and 300 parts by volume of benzene are heated to the reflux temperature of benzene. The water of condensation formed is removed azeotropically from the mixture. Condensation is terminated after about 7 hours. The solvent mixture is then removed quantitatively by vacuum distillation. The residue is then dissolved in 600 parts by volume of N,N-dimethylformamide and treated with 20 parts by weight of Raney nickel at 50°C for 3 hours to remove traces of dimethyl sulfoxide. The substance is then filtered and hydrogenated at a hydrogen pressure of 100 excess atmospheres for 2 hours at 95°C after the addition of 20 parts by weight of fresh Raney nickel. Lithium-4-sulfonato-benzyl-malonic acid diethyl ester remains behind after removal of the Raney nickel by filtration and removal of the dimethylformamide and excess diethyl malonate by distillation. The ester is solid but not crystalline at room temperature.

| Yield: | 326.6 parts by weight (=97.2% of the theory) | | | | |
|---|---|---|---|---|---|
| Analysis: | C | H | O | S | Li |
| % | | % | % | % | % |
| Calculated: | 50.0 | 5.1 | 33.3 | 9.5 | 2.1 |
| Found: | 50.6 | 4.8 | 33.9 | 9.4 | 2.9 |

We claim:
1. A sulfonato-benzyl-malonic diester of the general formula

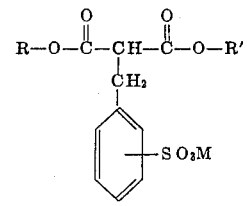

in which R and R', which can be different or identical, are a straight or branched chain alkyl group containing from 1 to 10 carbon atoms and M represents an alkali or alkali earth metal.

* * * * *